No. 874,643. PATENTED DEC. 24, 1907.
J. J. TOKHEIM.
FLUID GAGE OR INDICATOR.
APPLICATION FILED FEB. 14, 1907.
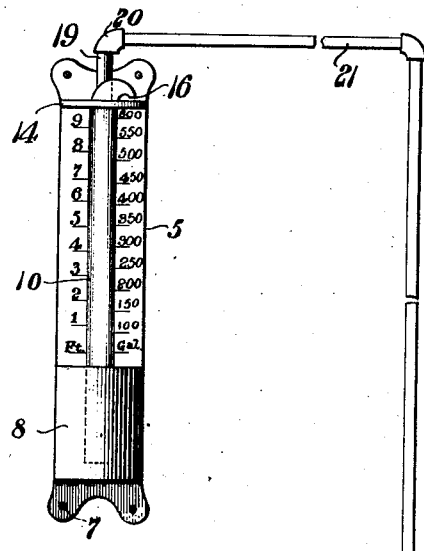
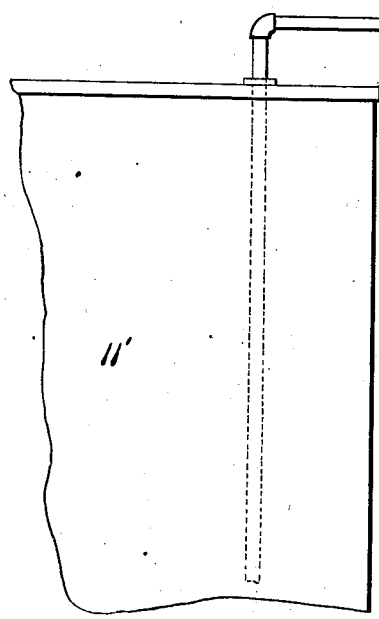
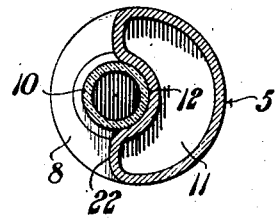
*Fig. 1.*
*Fig. 2.*
*Fig. 3.*
WITNESSES:
John J. Tokheim,
INVENTOR
By C. A. Snow & Co.
ATTORNEYS

UNITED STATES PATENT OFFICE.

JOHN J. TOKHEIM, OF CEDAR RAPIDS, IOWA.

FLUID GAGE OR INDICATOR.

No. 874,643.  Specification of Letters Patent.  Patented Dec. 24, 1907.

Application filed February 14, 1907. Serial No. 357,371.

*To all whom it may concern:*

Be it known that I, JOHN J. TOKHEIM, a citizen of the United States, residing at Cedar Rapids, in the county of Linn and State of Iowa, have invented a new and useful Fluid Gage or Indicator, of which the following is a specification.

This invention relates to fluid gages or indicators and has for its object to provide improved means for indicating the height and quantity of liquid in barrels, tanks and similar storage vessels.

A further object of the invention is to provide a gage having means for attachment to a wall or other suitable support and provided with a fluid containing chamber or reservoir to which is connected one end of a pipe or tube leading to the storage tank so that as the height of the liquid in the tank varies the variation in the air pressure in said tank will cause a corresponding movement of the fluid in the reservoir and thus indicate the height of the liquid in the storage tank.

A further object is to provide means for preventing the entrance of dust and other foreign matter through the open end of the indicator tube and means for preventing the withdrawal of the fluid from the reservoir.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a front elevation of a liquid indicator or gage constructed in accordance with my invention showing the same operatively connected with a storage tank. Fig. 2 is a longitudinal sectional view of the indicator or gage. Fig. 3 is a transverse sectional view taken on the line 3—3 of Fig. 2 and looking in the direction of the fluid reservoir.

Similar numerals of reference indicate corresponding parts in all of the figures of the drawings.

The improved gage which may be used for different purposes is preferably designed for use in automobiles, garages or in connection with automobiles to indicate the height or quantity of oil or other liquid in a storage tank.

The device consists of an elongated metallic casing or receptacle 5 having its opposite ends provided with laterally extending ears 6 for attachment to a wall or other suitable support, said casing being secured in position on the wall by means of screws, nails or similar fastening devices 7.

The lower end of the casing is provided with a cylindrical enlargement 8 defining a reservoir 9 adapted to contain a quanity of colored liquid, water or similar fluid which rises and falls within the indicating tube 10 as the air pressure in the storage tank or vessel 11' varies and thus indicates the height and quantity of liquid in said tank.

The upper portion of the casing 5 is provided with an air chamber 11 the front wall of which is formed with a longitudinal groove or depression 12 for the reception of the indicating tube 10 and thus serves to center the tube on the casing and prevent accidental displacement of the same.

The lower end of the indicating tube 10 extends through a shoulder 13 formed by the enlargement 8 and registers with the interior of the reservoir 9 while the opposite end thereof extends through an opening 14 formed in a laterally extending plate 15 carried by the casing.

The upper end of the tube 10 is provided with a vent opening or aperture 16 to permit the escape of air from the tube as the fluid from the reservoir 9 rises within the same, the perforated end of the tube being preferably curved laterally and downwardly so as to prevent the entrance of dust and other foreign matter to the reservoir 9.

A flexible packing or gasket 17 is preferably interposed between the tube 10 and the walls of the perforation in the shoulder 13 thereby to form a liquid tight joint at the point of entrance of the indicating tube within the reservoir.

The air chamber 11 extends from a point adjacent the shoulder 13 to the flange 15, and engaging an opening 18 formed in said flange is a pipe section 19 carrying an elbow or union 20.

Connected with the elbow 20 is a pipe or tube 21 which communicated with the tank or reservoir 11' so that as the height of the liquid in the tank varies the variation of the air pressure in said tank will cause a corresponding movement of the fluid within the reservoir 9 and thus cause the latter to rise within the tube 10 and indicate the height and quantity of liquid in the storage tank.

The front wall of the air chamber 11 on each side of the seating groove 12 is preferably flattened, as indicated at 22 and stamped, embossed or otherwise printed on said flattened faces are a plurality of graduations representing gallons and feet so that both the height and quantity of liquid within the tank may be determined at one reading of the indicator.

It will thus be seen that when oil or other liquid is introduced in the storage tank the air in the upper part thereof will be forced through the pipe 21 into the chamber 11 and thus cause the fluid in the reservoir 9 to ascend in the tube 10 and indicate the height of the quantity of liquid in the tank on the graduated dial of the indicator.

When a portion of the liquid is removed from the storage tank the air pressure being reduced, the fluid in the tube 10 will recede and also indicate the same on the dial.

By having the chamber 11 extend approximately the entire length of the casing it prevents drainage of fluid in the reservoir 9 in case a vacuum pump is attached to the storage tank when the latter is not supplied with a sufficient air vent.

It will also be observed that the front wall of the chamber 11 not only serves as a guard for the indicating tube but also serves as a dial for the indicator.

While the device is principally designed for indicating the height and volume of a quantity of liquid in a storage tank or similar containing vessel it is obvious that the same may be used with equally good results for ascertaining the height of a body of moving liquid such as a stream or river or wherever a device of this character is found desirable.

Having thus described the invention what is claimed is:

1. The combination with a storage tank, of an indicator including a casing having its lower end enlarged to form a fluid reservoir and its upper end provided with an air chamber, the exterior wall of the air chamber being provided with a longitudinal seating groove, an indicating tube seated within the groove and having its lower end communicating with the interior of the reservoir, the upper end of said tube being provided with a vent opening, and a pipe forming a source of communication between the air chamber and storage tank.

2. The combination with a storage tank, of an indicator including a casing, having a reservoir and provided with an air chamber communicating with the reservoir, there being a seating groove formed in one wall of the air chamber and a scale arranged on said wall at the seating groove, an indicating tube seated within the groove and having one end thereof extended within the reservoir and its opposite end projected laterally and provided with a vent opening, and a pipe forming a source of communication between the tank and reservoir.

In testimony that I claim the foregoing as my own, I have hereto affixed my signature in the presence of two witnesses.

JOHN J. TOKHEIM.

Witnesses:
   J. F. RALL,
   ELSIA A. RHODES.